United States Patent Office 3,000,789
Patented Sept. 19, 1961

3,000,789
PROTEIN HYDROLYSIS
Victor H. Bertullo, Rio de la Plata 1615, A.4, and Fernando Perez Hettich, Larranaga 3972, both of Montevideo, Uruguay
No Drawing. Filed Apr. 27, 1959, Ser. No. 808,947
6 Claims. (Cl. 195—29)

The present invention is directed to a process for hydrolyzing proteinaceous materials and the resultant product. More particularly, the present invention is directed to a process for hydrolyzing proteins by admixing proteinaceous material with the yeast *Saccharomyces platensis proteolytica,* n. sp., and fermenting the mixture until the proteins are hydrolyzed.

It has been discovered that when proteinaceous materials are admixed or inoculated with a culture of *Saccharomyces platensis proteolytica,* the protein is hydrolyzed into polypeptides and into amino acids whereupon the proteolytic action of the yeast terminates. This produces a paste containing polypeptides and amino acids, said paste maintaining its physical characteristics under storage for a considerable time without requiring any aggregate or filler. This paste may be used as silage for the feeding of animals or as a fertilizer. The silage or hydrolyzed product has other uses which will be described hereinafter.

As the source of protein there may be used any proteinaceous material such as whole fish, or parts thereof, internal organs of animals, animal embryos, animal products such as eggs or meat, blood, etc.

It is an object of the present invention to provide a process for hydrolyzing proteinaceous material.

It is a further object of the present invention to provide a process for hydrolyzing proteinaceous material by fermenting a mixture of the proteinaceous material and the yeast *Saccharomyces platensis proteolytica.*

It is a further object of the present invention to provide a product comprising hydrolyzed proteinaceous material.

These and other objects of the present invention will be readily apparent from the following description.

There has been discovered and isolated a new proteolytic yeast which has been given the name *Saccharomyces platensis proteolytica.* This yeast was isolated from the liver surface of the "Croaker corvina" (*Micropogon opercularis*), a common domestic fish in the Rio de la Plata. This yeast was isolated by routine methods of yeast isolation.

A deposit of a culture of this yeast has been made at the Veterinary School of Montevideo, University of the Republic of Uruguay, and has been assigned the Number L. 1.040.

MORPHOLOGICAL PROPERTIES OF *SACCHAROMYCES PLATENSIS PROTEOLYTICA*

(1) *Characteristics of vegetative reproduction*

(a) In potato agar at 25° C.: Good growth and effective reproduction after 48 hours. Typical yeast conglomerate of a variable size. After 72 hours central or polar vacuoles, the spherical shape predominating. Germination by gemmation which is born in any part of the cell, but preferably at the poles.
(b) In corn flour agar at 25° C.: Similar gemmation.
(c) In saccharose dextrose broth (nutritive broth Difco 0.8%, saccharose and dextrose 1%, distilled water 100 ml.): Polar buds, in the majority, in the form of a button which are joined to the cell by a peduncle that is stained in gram negative.

(2) *Shape and size of the cells*

In malt extract medium, potato agar medium, corn flour medium at 25° C.: Average size, 9 x 6 microns, the smallest cell being 5 x 3 microns and the largest cell being 15 x 8 microns (3) *Formation of ascospores*

Gorodkova agar, blocks of gypsum, potato or carrot plugs were used. Potato and carrot plugs were rejected because of a too vigorous growth, with scarce production of spores after 8 days. The Kufferath stain technique was used. Number of ascospores per cell: 2–3, very frequent; 1, very frequent; 4, very rare. Location: When there is only one, it is polar or central; when two, symmetrical and polar; when three, in a triangle; and four in a rhombus.

(4) *Properties of the ascospores*

Shape: "In vivo," very spherical and stained somewhat elongated or round.
Color: "In vivo," refringent, limpid spheres or with grayish granules in their interior. With Kufferath they are stained to a bright red.
Partitioning: no.
Wrinkling of walls: No.
Wrinkling of edges: No.
Presence of drops of fat: No.
Size: "In vivo," 4 x 4 microns. Through Kufferath, 3 x 3 microns.

(5) *Macro-morphological characteristics of the cultures*

Malt extract, 25° C.: Deposit forming abundant sediment, in the bottom of the tube and limpid and translucid supernatant liquid.
In Raulin medium, 25° C.: Good growth forming a grayish white deposit that rises in the form of a cloud on shaking the tube.
In a saccharose lactose nutritive broth medium, 25° C.: Abundant sediment, grayish white color after 24 hours, increasing until the fourth or fifth day, then the reproduction becoming stationary.
Colonies are produced in malt agar, in malt agar plus 2% calcium carbonate and in gelatin malt, the latter producing giant colonies
Colonies: 8 days, smooth, raised, white, vigorous; 30 days, smooth, white, creamy, smooth, dull and dry, festooned edge.

PHYSIOLOGICAL PROPERTIES (1) *Formation of the film in a liquid medium*

It does not form a film in malt extract at 25° C. and 17° C.

(2) *Fermentation of sugars*

Tests made in Durham tubes and by the Guerra Method at 25° C. Observations after 24–48 hours and ten days. It ferments glucose, galactose, saccharose and maltose. It does not ferment lactose. In an Einhorm fermentometer, it ferments two-thirds raffinose in 48 hours.

(3) *Assimilation of sugars*

In a liquid medium at 25° C. and auxanographic medium at 25° C.: In the first, at the end of 30 days, it assimilates glucose, galactose, saccharose and maltose. It does not assimilate lactose. In the second, after three days, the same.

(4) *Assimilation of nitrates*

Liquid medium: Ammonium sulfate, positive.
By auxanography:
(a) Mineral nitrogen, Potassium nitrate and ammonium sulfate: positive (b) Peptones: Bacto triptone Difco and Peptone Meat Powder of the Fine Chemical Company of Canada: positive (c) Urea: positive (d) Amino acids (acyclic), Asparagine and glycocoll: positive (e) Amino acids (cyclic), Histidine and tryptophan: positive (5) *Ethanol as sole source of carbon*

Negative after thirty days at 25° C.

(6) *Splitting of arbutin and esculin*

Positive after 24 hours. Very positive after 48 hours. Culture at 25° C.

(7) *Production of carotenoid pigments*

Through visual observation, negative (8) *Production of compounds similar to starch*

Negative (9) *Production of esters*

Negative

(10) *Reaction in litmus milk*

It begins after 24 hours and is complete after four days, peptonizing the medium which coagulates after ten days.

(11) *Splitting of the fats*

Negative

(12) *Production of acid*

18 days, positive

(13) *Proteolysis*

(a) Alkaline egg medium: Egg (the Manual of Microbiological Methods, pp. 55–56, of the Society of American Bacteriologists. McGraw-Hill Book Co.) with 1% saccharose: One fourth after 24 hours; complete after 48 hours (b) Hydrolysis of gelatine: 12% gelatine with 1% saccharose: Hydrolysis begins after 48 hours, complete after 10 days

(14) *Variation of the pH in nutritive saccharose broth medium*

Initial pH: 6.78; pH after 24 hours: 5.00; pH after 48 hours: 4.25; pH after 72 hours: 4.20; pH after 4 days: 4.30; pH after 7 days: 4.50; pH after 18 days: 5.18

(15) *Alcohologenous power*

Fermentation of a liquid containing 0.8% nutritive Difco broth, 10% saccharose, and 100 mls. distilled water at 25° C.

Remaining sugar (evaluated as invert sugar): 24 hours, 7.68 gr.; 48 hours, 4.76 gr.; 72 hours, 2.70 gr.; 7 days, 0.125 gr.

Alcohol formed: 24 hours, 0.993 gr.; 48 hours, 2.840 gr.; 72 hours, 3.726 gr.; 7 days, 4.968 gr.

EXAMPLE

The above described yeast is admirably suitable for hydrolyzing proteinaceous material. By way of example, whole fish, fish remains, internal animal organs, or animal embryos may be used as the proteinaceous material. These materials are finely ground to make a homogeneous paste. Alternatively, undefibrinated blood or whole eggs may be used as the proteinaceous material.

With 1000 kg. of any of the above described materials or mixtures of the same, there is intimately admixed 200 kg. of sugar or beet molasses. To 100 kg. of the mixture there is added 1 liter of a culture of the yeast *Saccharomyces platensis proteolytica*. This culture has a concentration of one million yeast cells per ml. However, the concentration of the yeast cells in the culture is variable and can be increased without limit if desired.

The mixture of the proteinaceous material, sugar and yeast is maintained at a temperature between 22–25° C. The mixture is stirred occasionally, for example, three times a day, for 8 days. Between the third and fourth day, the volume of the mixture will increase to more than double and almost triple the original volume. During this period, the initial pH, which is variable according to the starting proteinaceous material, will decrease slowly. Between the fourth and fifth day the pH will be about 5.00–4.80 and will then begin to rise. The pH will become stabilized between the eighth and tenth day between about 5.75 and 5.85 at which point the fermentation is ended.

The product at the end of the fermentation is a paste having a more or less dark brown color, the color depending upon the proteinaceous starting material. The odor of the fermentation mass during the first stages is that of ripe fruit (apple), the final odor becoming similar to that of dried fig raisins.

The final product of fermentation, if maintained cool and covered, will maintain its properties under storage for an indefinite period.

Although the fermentation as above described is preferably done at a temperature between about 22–25° C., the temperature may be any temperature at which the yeast will grow. Broadly, the temperature range of fermentation is between about 8° C. and 37° C. However, in practice, the lower temperatures may not be as desirable because the hydrolysis of the protein is less complete. The ideal temperature for storing the final product is between about 12–18° C., although the temperature may be as high as 25° C., or even somewhat higher.

During the fermentation, the presence or absence of oxygen is immaterial since the yeast is anaerobic. In the above example, the fermentation was carried out open to the atmosphere. Similarly, the presence or absence of oxygen during storage is not material.

Instead of adding sugar or beet molasses, any fermentable sugar may be present during fermentation. For example, there may be used maltose, glucose, galactose, saccharose or any other fermentable sugar.

The final product of fermentation may be used as silage for the feeding of animals or as fertilizer. Furthermore, the hydrolyzed protein material may be used as a human food or food supplement and medicine, particularly in geriatric and pediatric cases. In such cases it is frequently necessary to prescribe specific proteins or concentrated preparations of internal organs, e.g., liver concentrates.

As an animal food, the final product may comprise 30% to 40% of a balanced food for chickens, pigs, etc.

The hydrolyzed fish products can be used as a base for insecticides or pesticides wherein the base will function to attract the insects.

Hydrolyzed blood can be used industrially for the preparation of foaming substances such as are used in fire extinguishers.

During the hydrolysis the amount of vitamin $B_1$ and $B_{12}$ which is found naturally in the proteinaceous material, such as in fish, is increased. Since the fermentation process is carried out at a relatively low temperature, and may be carried out in a closed vessel, no proteins, vitamins, nor mineral salts are lost. On the contrary, there is added to the proteinaceous material the minerals and ingredients of molasses and those which the yeast itself produces.

The amount of sugar added to the proteinaceous material is not critical. The preferred amount of sugar may vary between about 18 and 20% by weight of the proteinaceous material.

We claim:

1. A process for hydrolyzing proteins comprising inoculating proteinaceous material with *Saccharomyces platensis proteolytica* in the presence of a fermentable sugar and fermenting the mixture.

2. A process for hydrolyzing proteins comprising inoculating proteinaceous material with *Saccharomyces platensis proteolytica* in the presence of a fermentable sugar and fermenting the mixture at a temperature between about 8–37° C.

3. A process for hydrolyzing proteins comprising inoculating proteinaceous material with *Saccharomyces platensis proteolytica* in the presence of a fermentable sugar and fermenting the mixture at a temperature between about 8–37° C. until the pH is stabilized.

4. A process for hydrolyzing proteins comprising inoculating proteinaceous material with *Saccharomyces platensis proteolytica* in the presence of a fermentable sugar and fermenting the mixture at a temperature between about 22–25° C. until the pH is stabilized.

5. A process for hydrolyzing proteins which comprises inoculating proteinaceous material selected from the class of fish, animal, blood, eggs, and mixtures of the same with *Saccharomyces platensis proteolytica* in the presence of a sugar selected from the group consisting of maltose, glucose, galactose, and saccharose and fermenting the mixture at a temperature between about 22–25° C. until the pH is stabilized.

6. A process for hydrolizing proteins comprising inoculating proteinaceous material with *Saccharomyces platensis proteolytica* in the presence of molasses and fermenting the mixture.

References Cited in the file of this patent

UNITED STATES PATENTS 2,536,171    Hall et al. _____ Jan. 2, 1951

OTHER REFERENCES

Harris: "The Chemistry and Biology of Yeast," 1958, pp. 439 to 442.